(12) United States Patent
Weber et al.

(10) Patent No.: US 9,586,590 B2
(45) Date of Patent: Mar. 7, 2017

(54) CONTROL DEVICE, DRIVE TRAIN, METHOD AND PROGRAM FOR REDUCING NOISE DEVELOPMENT IN A DRIVE TRAIN AND/OR FOR INCREASING INERTIA IN AN IDLE SPEED

(71) Applicant: ZF FRIEDRICHSHAFEN AG, Friedrichshafen (DE)

(72) Inventors: Christian Weber, Ebersburg (DE); Axel Rohm, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 72 days.

(21) Appl. No.: 14/420,282

(22) PCT Filed: Jul. 12, 2013

(86) PCT No.: PCT/EP2013/064748
§ 371 (c)(1),
(2) Date: Feb. 6, 2015

(87) PCT Pub. No.: WO2014/023508
PCT Pub. Date: Feb. 13, 2014

(65) Prior Publication Data
US 2015/0217774 A1 Aug. 6, 2015

(30) Foreign Application Priority Data
Aug. 9, 2012 (DE) .................. 10 2012 214 128

(51) Int. Cl.
*B60W 10/02* (2006.01)
*B60W 10/11* (2012.01)
(Continued)

(52) U.S. Cl.
CPC .......... *B60W 30/20* (2013.01); *B60W 10/026* (2013.01); *B60W 10/11* (2013.01);
(Continued)

(58) Field of Classification Search
CPC .... B60W 10/026; B60W 10/06; B60W 10/11; B60W 30/20; B60W 2510/06; B60W 2520/04; B60W 2710/024
See application file for complete search history.

(56) References Cited

U.S. PATENT DOCUMENTS 4,558,612 A * 12/1985 Shimizu .................. F16H 59/08
477/115
6,026,940 A * 2/2000 Sudau .................... F16F 15/145
192/3.28
(Continued)

FOREIGN PATENT DOCUMENTS

DE 198 04 227 8/1999
DE 100 44 493 3/2002
(Continued)

*Primary Examiner* — Ramya Burgess
*Assistant Examiner* — David Morris
(74) *Attorney, Agent, or Firm* — Cozen O'Connor (57) ABSTRACT

A control device for a drivetrain of a vehicle, includes a drive engine, a starting element, and a coupling element. The coupling element brakes a secondary side when the control device receives an input signal indicating a switching off of the drive engine. The starting element includes a mass damper torsional damper arrangement with at least one damper mass. The starting element is coupled with the drive engine by a primary side and with the mass damper torsional damper arrangement by a secondary side so as to be fixed with respect to relative rotation, and the coupling element is constructed to brake the secondary side by coupling with the primary side of the starting element and/or by coupling with a reference component that stationary when the vehicle is stationary. This makes it possible to find a better compromise between comfort, responsiveness, economical, and ecological aspects of the drivetrain.

11 Claims, 3 Drawing Sheets

(51) Int. Cl.
  *B60W 30/18*      (2012.01)
  *B60W 30/20*      (2006.01)
  *F16H 45/02*      (2006.01)
  *F16H 61/14*      (2006.01)
  *B60W 30/192*     (2012.01)
  *B60W 10/06*      (2006.01)
  *F16H 57/00*      (2012.01)

(52) U.S. Cl.
  CPC ........... *B60W 30/192* (2013.01); *F16H 45/02* (2013.01); *F16H 61/143* (2013.01); *B60W 10/06* (2013.01); *B60W 2030/206* (2013.01); *B60W 2510/06* (2013.01); *B60W 2520/04* (2013.01); *B60W 2710/024* (2013.01); *B60Y 2300/45* (2013.01); *F16H 57/0006* (2013.01); *F16H 2045/0226* (2013.01); *F16H 2312/20* (2013.01)

(56) References Cited

U.S. PATENT DOCUMENTS

| | | | |
|---|---|---|---|
| 9,309,965 B2* | 4/2016 | Itazu | F16H 61/143 |
| 9,333,974 B1* | 5/2016 | Gibson | B60W 30/192 |
| 2002/0056599 A1* | 5/2002 | Suzuki | F16H 45/02 |
| | | | 192/3.25 |

FOREIGN PATENT DOCUMENTS

| | | |
|---|---|---|
| DE | 103 17 634 | 11/2004 |
| DE | 10 2009 047 382 | 7/2010 |
| EP | 2 280 195 | 2/2011 |

* cited by examiner

CONTROL DEVICE, DRIVE TRAIN, METHOD AND PROGRAM FOR REDUCING NOISE DEVELOPMENT IN A DRIVE TRAIN AND/OR FOR INCREASING INERTIA IN AN IDLE SPEED

CROSS REFERENCE TO RELATED APPLICATIONS

This is a U.S. national stage of application No. PCT/EP2013/064748, filed on Jul. 12, 2013. Priority is claimed on German Application No.: DE102012214128.6 filed Aug. 9, 2012, the content of which is incorporated herein by reference.

BACKGROUND OF THE INVENTION

1. Field of the Invention

The present invention is directed to control devices for a drivetrain of a vehicle, drivetrains for a vehicle and a method for reducing noise generation in a drivetrain of a vehicle, a method for increasing an inertia at an idling speed in a drivetrain of a vehicle, and to programs with a program code for implementing one of the methods when these methods run on a programmable hardware component. The vehicles can be motor vehicles.

2. Description of Prior Art

In modern drivetrains in vehicles, particularly motor vehicles, mass damper torsional damper arrangements are increasingly used within the framework of starting elements to enhance driving comfort. These mass damper torsional damper arrangements eliminate torsional vibrations from the drivetrain as far as possible. These torsional vibrations can occur, for example, owing to an operating principle of a drive engine.

However, use of mass damper torsional damper arrangements can cause noise generation from the drivetrain that a driver of the relevant vehicle could perceive as annoying or possibly even as indicative of a defect in the vehicle although the vehicle has no such defect. The use of mass damper torsional damper arrangements also leaves room for improvement with regard to a balance between comfort, responsiveness of the drive engine, and economical and ecological aspects.

Accordingly, EP 2 280 195 A1 describes a method for controlling a converter lockup clutch of an automatic transmission in a motor vehicle. DE 100 44 493 A1 is directed to a multiple-clutch arrangement, particularly a dual clutch arrangement for load-shiftable transmissions.

SUMMARY OF THE INVENTION

There is a need to find a better compromise between comfort, responsiveness and economical and ecological aspects of a drivetrain of a vehicle.

A control device according to one embodiment for a drivetrain of a vehicle, for example a motor vehicle, is constructed to actuate a coupling element such that the coupling element brakes a secondary side of a starting element when the control device receives an input signal indicating a switching off of a drive engine. The drivetrain of the vehicle comprises a drive engine, the starting element, and the coupling element. The starting element comprises a mass damper torsional damper arrangement with at least one damper mass. The starting element is coupled with the drive engine by a primary side and with the mass damper torsional damper arrangement by the secondary side so as to be fixed with respect to relative rotation. The coupling element is further constructed to brake the secondary side by coupling with the primary side of the starting element and/or by coupling with a reference component which is stationary when the vehicle is stationary.

The control device can counteract noise generation having its source in the at least one damper mass of the mass damper torsional damper arrangement in that this mass damper torsional damper arrangement is adapted with respect to its rotational speed or is braked by the specific coupling with the primary side or with the reference component. For this purpose, the control device uses the input signal indicating the switching off of the drive engine.

The drive engine can be an internal combustion engine for example an automobile engine, a diesel engine, or a Wankel engine, which can be charged or constructed as naturally aspirated engine. The drive engine can also be an electric motor or other motor.

The starting element can be a hydrodynamic starting element, i.e., a hydrodynamic torque converter or a friction clutch, or a combination thereof, wherein a friction clutch provides a frictionally engaging connection between the primary side and the secondary side. Accordingly, for example, a hydrodynamic starting element can be implemented with a lockup clutch based on a friction clutch. The starting element can optionally be an element that is constructed such that it always transmits a drag torque to the secondary side during a rotational movement of the primary side.

A mass damper torsional damper arrangement comprises at least one damper mass guided and supported by at least one guide component such that it can execute an oscillation such that a vibration component of a rotational movement imparted to the mass damper torsional damper arrangement can be partially or completely compensated by the oscillation of the at least one damper mass.

A control device according to one embodiment can be used optionally, for example particularly efficiently, when the drivetrain is so constructed that the coupling element comprises a hydrodynamic starting element constructed to transmit a rotational movement from the primary side to the secondary side. A hydrodynamic starting element of this type can be the aforementioned hydrodynamic torque converter. In this case, the coupling element can comprise a lockup clutch of the hydrodynamic starting element constructed to couple the primary side and the secondary side to one another via a frictionally engaging connection or a frictional contact. A control device according to one embodiment can accordingly make use of a coupling element already present in the drivetrain to counteract noise generation in the mass damper torsional damper arrangement.

A frictionally engaging connection is based on components correspondingly connected to one another substantially to be fixed with respect to rotation relative to one another due to a static friction and a normal force component causing this static friction. In frictional contact, by contrast, there can also be a difference in rotational speed a slippage between the components which are in frictional contact with one another. Thus a coupling by means of frictional contact generally also includes a frictionally engaging connection.

A control device according to one embodiment can also optionally be used in a particularly efficient manner when the drivetrain comprises an automatic transmission coupled via a transmission input shaft with the secondary side of the starting element and comprises the reference component. The coupling element in this case comprises a shifting element, for example a disk clutch or a band brake, which is constructed to form or strengthen a frictionally engaging connection to or a frictional contact with the reference component, for example a shaft of the automatic transmission or a part of a housing of the automatic transmission. A control device according to one embodiment can also be used in this way in a particularly efficient manner in that it uses a coupling element already provided in the drivetrain.

In a control device according to one embodiment, the input signal can optionally be a switching off of the drive engine initiated, for example, by a driver of the vehicle and/or a decrease in a rotational speed of a shaft of the drivetrain, for example of an output shaft of the drive engine or an input shaft of the starting element, below a predetermined threshold speed. The predetermined threshold speed is, or corresponds to, at most 90% of an idling speed of the drive engine, wherein gear reductions or gear multiplications which may possibly be implemented can be taken into account. In other embodiments, the predetermined threshold speed can also be lower, for example at most 80%, at most 60%, at most 50%, or at most 30% of the idling speed of the drive engine. The input signal of the vehicle can be initiated by the driver, for example, by means of an operator control for controlling the drive engine. This operator control can be, for example, an ignition key or a button or other control button operated by the driver to send a switch-off command for the drive engine.

Optionally, a control device according to one embodiment can further be constructed to brake the secondary side upon the input signal only when a further condition is met, for example when the drivetrain comprises an automatic transmission, wherein the further condition is met when a further input signal indicates a non-driving setting of the automatic transmission. This can make it possible to an operating error on the part of the driver and/or to increase the operating reliability of the control device and drivetrain, including components thereof. Thus the further input signal can be supplied or generated by the driver via an operator control for gear selection of the automatic transmission, wherein a non-driving setting or gear selection of the automatic transmission can include, for example, a park position (P) or an idle or neutral position (N). In addition or alternatively, a torque transmission by the transmission can be interrupted in a non-driving position such that it is possible to actuate the coupling element without great effort.

One embodiment further comprises a drivetrain for a vehicle for a motor vehicle, which includes a drive engine, described above, a corresponding starting element, a coupling element, and a control device. Embodiment examples further show corresponding methods for reducing noise generation in a drivetrain of a vehicle comprising the components described above. A method of this type includes reception of an input signal and actuation of the coupling element such that the coupling element brakes the secondary side when the input signal indicates a switching off of the drive engine. One embodiment includes a corresponding program with a program code for implementing a method according to an embodiment example when the program runs on a programmable hardware component, i.e., for example, a processor, an application-specific integrated circuit (ASIC), a system on a chip (SOC), a control device or other comparable components.

A control device according to one embodiment for a drivetrain of a vehicle, for example, of a motor vehicle, is constructed to actuate a transmission in such a way upon a control signal indicating when an idling speed of a drive engine has been reached that a torque transmission from an input shaft to an output shaft of the transmission is substantially prevented or interrupted. The control device is likewise constructed to actuate a starting element in such a way upon the aforementioned control signal that a torque transmission from a primary side of the starting element to a secondary side of the starting element is provided or increased. The drivetrain of the vehicle comprises a drive engine, the starting element and the above-mentioned transmission, wherein the starting element comprises a mass damper torsional damper arrangement, wherein the starting element is coupled by its primary side to the drive engine and by its secondary side to the mass damper torsional damper arrangement and the input shaft of the transmission so as to be fixed with respect to relative rotation.

A control device according to one embodiment is accordingly based on the insight that by making use of components which are included in the drivetrain in any case a better compromise can be made between comfort, responsiveness of the drivetrain and economical and ecological aspects in that by actuating the transmission and starting element upon a control signal in the manner described above an inertia at an idling speed in the drivetrain of the vehicle can be increased so that any occurring noise generation can be reduced and comfort can accordingly be increased. Moreover, it is possible in addition or alternatively to also reduce the idling speed of the drive engine and accordingly to reduce consumption and/or wear.

In a control device according to one embodiment the actuation of the transmission for interrupting or preventing torque transmission can include a disengagement of a gear, an engagement of an idling gear, and/or an opening of at least one shifting element of the transmission such that the torque is no longer transmitted from the input shaft to the output shaft of the transmission. A transmission of this type can optionally be an automatic transmission. Therefore, the desired increase in inertia at idling speed can possibly be achievable without additional components by employing a control device.

In a control device according to one embodiment, the actuation of the starting element for providing or increasing the torque transmission can optionally include providing or increasing a frictionally engaging connection or a frictional contact. Accordingly, in a control device according to one embodiment the starting element can include a hydrodynamic torque converter, e.g., a lockup clutch based on a friction clutch, wherein the actuation of the starting element for providing or increasing the torque transmission is carried out in such a way that the lockup clutch is closed. Alternatively or in addition, the starting element can include a friction clutch as main clutch, wherein the actuation of the starting element for providing or increasing the torque transmission is carried out in such a way that the friction clutch is closed.

Further, a control device according to one embodiment can be constructed to actuate the starting element upon a further control signal indicating a start-up command such that the torque transmission is canceled or reduced, the transmission is actuated in such a way that it takes on an operating condition corresponding to the start-up command, and the starting element is actuated in such a way that a torque transmission from the primary side to the secondary side is provided or increased when a speed of the drive engine exceeds a predetermined threshold speed. The predetermined threshold speed is higher than the idling speed of the drive engine.

In a control device of this type according to one embodiment, the actuation of the starting element for canceling or reducing the torque transmission can include a canceling or weakening of a frictionally engaging connection or of a frictional contact. In a control device of this type according to one embodiment the starting element comprises a hydrodynamic torque converter with a lockup clutch, the actuation of the starting element for canceling or reducing the torque transmission can optionally be carried out such that the lockup clutch is opened. In addition or alternatively, in a corresponding control device for a drivetrain in which the starting element comprises a friction clutch, the actuation of the starting element for canceling or reducing the torque transmission can be carried out such that the friction clutch is opened.

The control device can accordingly utilize any available structures and components of the drivetrain through a skillful actuation thereof for increasing the inertia at the idling speed in the drivetrain of the vehicle.

Embodiments further include a drivetrain for a vehicle that comprises a drive engine, the above-described starting element and a control device. Embodiments also include a method for increasing an inertia at an idling speed in a drivetrain of a vehicle such as was described above. The method then includes a reception of a control signal indicating that the idling speed of the drive engine has been reached, an actuation of the transmission such that a torque transmission from the input shaft to an output shaft of the transmission is substantially prevented when the control signal indicates that the idling speed of the drive engine has been reached, and an actuation of the starting element such that a torque transmission from the primary side to the secondary side is provided or increased when the control signal indicates that the idling speed of the drive engine has been reached. Embodiment examples likewise include a program with a program code for implementing a method according to an embodiment example when the program runs on a programmable hardware component such as the hardware components which were already mentioned above by way of example.

BRIEF DESCRIPTION OF THE DRAWINGS

Embodiment examples will be described and explained more fully in the following with reference to the accompanying drawings.

DETAILED DESCRIPTION OF THE PRESENTLY PREFERRED EMBODIMENTS

Identical or comparable components are designated by the same reference numerals in the following description of the accompanying drawings. Further, collective reference numerals are used for components and objects which occur more than once in an embodiment example or in a diagram but which are described collectively with respect to one or more features. Components or objects which are described by identical reference numerals or collective reference numerals may be constructed identically or possibly also differently with respect to one or more or all features, for example, their dimensions, unless otherwise explicit or implicit from the description.

Figure 1:
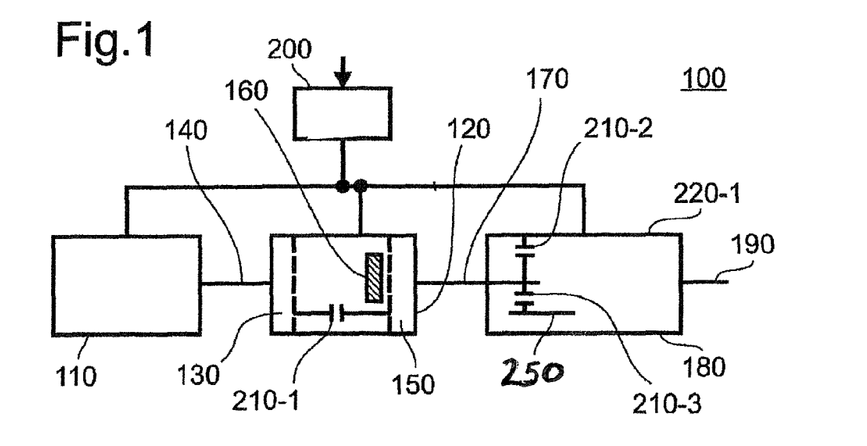
FIG. 1 is a schematic block diagram of a drivetrain according to an embodiment example in a vehicle.

FIG. 1 is a schematic block diagram of a drivetrain 100 according to one embodiment in a vehicle, for example, in a motor vehicle. A motor vehicle of this type can be, e.g., a passenger car, a truck or other utility vehicle having a corresponding drivetrain 100.

The drivetrain 100 includes a drive engine 110, which can be an electric motor but which can also be an internal combustion engine, i.e., an Otto engine, a diesel engine, or a Wankel engine. The drive engine 110 can be turbocharged, but other charging techniques, e.g., mechanical charging, can also be used. The drive engine 110 can also be constructed as a naturally aspirated engine. The drivetrain 100 further comprises a starting element 120, which is coupled with a primary side 130 at an output shaft 140 of the drive engine 110. The starting element 120 further comprises a secondary side 150, which is coupled with a mass damper torsional damper arrangement 160 and an input shaft 170 of a transmission 180. The transmission 180 can be constructed for example as an automatic transmission.

An automatic transmission differs from a manual transmission by its actuation. In the case of shift transmissions, actuation is carried out in an automatic transmission via a control device which sends, e.g., electric or hydraulic control signals to corresponding actuators and shifting elements of the transmission 180, whereas in manual transmissions a substantially direct mechanical or hydraulic connection of a corresponding operator control of the driver is implemented for changing gears. Accordingly, automatic transmissions within the framework of the present description also include dual clutch transmissions and transmissions in which the gears are actuated or changed via electric, hydraulic or other signals which are not directly conveyed by a driver on mechanical or hydraulic paths. Thus an automatic transmission is a transmission 180 in which control signals for changing the gears or speeds are carried out through a control device 200. Without limiting generality, the following description pertains to automatic transmissions 180 virtually exclusively. However, embodiment examples can also possibly be used in connection with other transmissions.

The transmission 180 further comprises an output shaft 190 via which a torque transmitted from the drive engine 110 to the input shaft 170 via the starting element 120 can be conveyed further when the transmission 180 is not in a non-driving setting or in a non-driving operating condition. In case of an automatic transmission, a corresponding non-driving operating condition can be, for example, a parking position or parking setting (P) or an idle or neutral position (N). In automatic transmissions 180, the parking position is often implemented in that the output shaft 190 of the transmission 180 is mechanically locked. In contrast, a transmission of torque from the input shaft 170 to the output shaft 190 of the transmission 180 is prevented or interrupted in the idle position or neutral position of the automatic transmission 180 because of an actuation of at least one shifting element, some of the shifting elements or all of the shifting elements of the transmission 180.

The drivetrain 100 in FIG. 1 further has a control device 200 which is connected in the present embodiment example to the drive engine or module 110, starting element 120 and transmission 180 in such a way that the control device 200 can send control signals to, and receive information signals from, the relevant components.

Further, the drivetrain 100 comprises at least one coupling element 210 constructed to couple the secondary side 150 of the starting element 120 to another component of the drivetrain 100 or peripherals thereof, a reference component 220, in order to change a rotational speed of the secondary side 150 and therefore of the mass damper torsional damper arrangement 160 connected to the latter. More exactly, the drivetrain 100 shown in FIG. 1 comprises three coupling elements 210-1, 210-2, 210-3. The coupling elements 210 are constructed to brake the secondary side 150 of the starting element 120 by coupling with the primary side 130 of the starting element 120 and/or by coupling with a reference component 220 which is stationary when the vehicle is stationary.

The control device 200 is constructed to actuate the coupling element 210 in such a way that it brakes the secondary side 150 of the starting element 120 when the control device 200 receives an input signal indicating that the drive engine 110 is turned off. This is shown in a schematically simplified manner in FIG. 1 by an arrow directed into the control device 200. The relevant input signal can also be made available to the control device 200 via a signal line or a signal bus via which the control device 200 is able to control the other components shown in FIG. 1.

As has already been mentioned, FIG. 1 shows three different coupling elements 210-1, 210-2 and 210-3. In an embodiment example of a drivetrain 100 and a control device 200, it is not necessary to implement more than one coupling element 210 insofar as a coupling element 210 need be implemented at all. Of course, more than one, two or three coupling elements can also be implemented in other embodiment examples. Accordingly, depending on concrete configuration, the coupling elements 210 and the quantity, arrangement and design thereof are optional aspects.

The starting element 120 is a hydrodynamic starting element, for example a hydrodynamic torque converter constructed to transmit a rotational movement from the primary side 130 to the secondary side 150. In this case, the coupling element 210-1 can comprise a lockup clutch 240 of the hydrodynamic starting element constructed to couple the primary side 130 and the secondary side 150 to one another via a frictionally engaging connection or at least a frictional contact. The lockup clutch 240 is also referred to as a converter clutch. In case of frictional contact, in contrast to a frictionally engaging connection, a difference in the rotational speed, i.e., slippage, can also occur.

In addition to or as an alternative to the implementation of the coupling element 210-1 as lockup clutch 240, a coupling element 210 can also be implemented within the framework of the transmission 180, e.g., when the latter is an automatic transmission. In an automatic transmission, the gears or speeds are selected in that the automatic transmission 180 is correspondingly actuated by a control device, i.e., the control device 200 according to one embodiment example. It accordingly differs in particular from manual transmissions in that with an automatic transmission there is no mechanical connection between an operator control for gear selection and the actual transmission. Accordingly, aside from conventional automatic shift transmissions, automatic transmissions also include those in which a gear selection is made via electronic control pulses, i.e., dual clutch transmissions or other electrically shifted transmissions.

In this case, the coupling element 210 can also cause the secondary side 150 to be coupled relative to a reference component 220, which is stationary when the vehicle is stationary. Accordingly, the reference components 220 can be a shaft 250 of the transmission 180 (coupling element 210-3) or a part of a housing 260 of the transmission 180 (reference component 220-1, coupling element 210-2). In this case, the participating coupling elements 210-2, 210-3 are typically shifting elements 270 of the transmission 180, i.e., disk clutches or band brakes thereof, which are often already provided. Therefore, it is possible to implement an embodiment example at only a slight additional expenditure. They are also constructed to provide or strengthen a frictionally engaging connection or a frictional contact with the relevant reference components 220.

The input signal, which is received by the control device 200 and indicates that the drive engine is stopped, can indicate a switching off of the drive engine 110. The driver can cause the drive engine 110 to be turned off in this way via an operator control for controlling the drive engine 110, i.e., an ignition key, a switch, button or other operator control. However, the input signal can also possibly be a signal indicating a switching off of the drive engine 110 which was not initiated by the driver but possibly by the control device 200 itself or by another control device of the vehicle.

Alternatively or in addition, the input signal for the control device can also indicate a decrease in a rotational speed of the shafts of the drivetrain 100 below a predetermined threshold speed, and the predetermined threshold speed can correspond to at most 90% of an idling speed of the drive engine 110. The corresponding shafts of the drivetrain 100 can be the output shaft 140 of the drive engine 110 or a corresponding input shaft of the starting element 120. The relevant shafts can also possibly be arranged behind an assembly causing gear reduction or gear multiplication, i.e., behind the transmission 180, for example. In this case, the relevant gear reduction or gear multiplication is to be taken into account where applicable.

Of course, other predetermined threshold speeds that correspond to at most 80%, at most 60%, at most 50%, or at most 30% of the idling speed of the drive engine 110, for example, can be used to reduce the likelihood of erroneous initiation.

Additionally, the control device 200 can also be formed in such a way that it brakes the secondary side 150 upon the input signal only when a further condition is met in addition. The further condition can be met when a further input signal indicates a non-driving setting of the automatic transmission 180. In other words, the control device 200 can possibly initiate the braking of the secondary side 150 only when the transmission 180 is in its park position (P) or its neutral position (N) for example.

Figure 2:
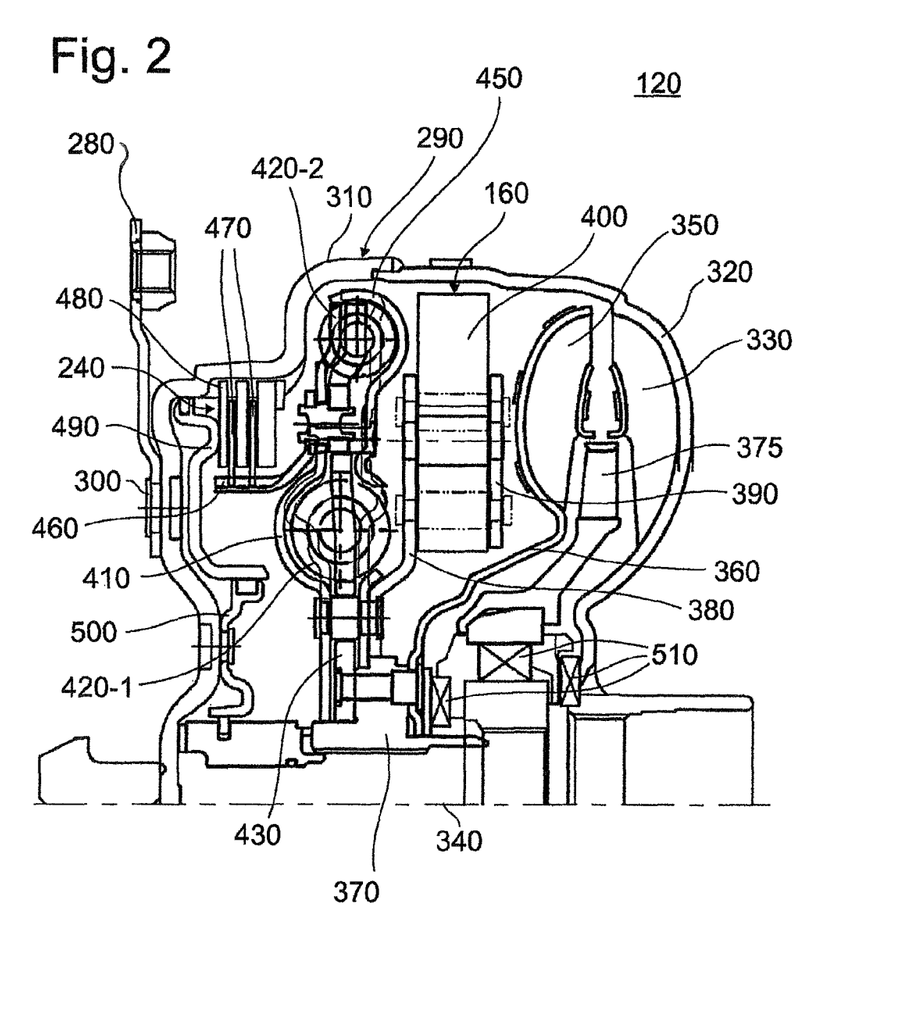
FIG. 2 is a cross-sectional view through a starting element with a coupling element in the form of a hydrodynamic torque converter.

FIG. 2 shows a cross-sectional view through a starting element 120, more exactly a hydrodynamic starting element in the form of a hydrodynamic torque converter. In this case, the primary side 130 comprises a flexible connection element 280 which serves to mechanically connect the starting element 120 to the drive engine 110, not shown in FIG. 2. The flexible connection element 280 is constructed in such a way that it can be screwed or otherwise fastened to the output shaft 140 of the drive engine 110, also not shown in FIG. 2, but allows a compensation of wobbling vibrations and other movements to a certain degree. In this way, it is also possible, if necessary, to bridge an axial space that can result from different drive engines 110 within a series or model range of vehicles. The flexible connection element 280 is coupled with a housing 290 of the hydrodynamic starting element via a rivet connection 300. The housing 290 likewise serves as primary side of the starting element 120. Accordingly, the housing 290 has a first housing shell 310 and a second housing shell 320 welded thereto. The second housing shell 320 has a plurality of impeller blades 330 at a side of the housing 290 remote of the drive engine 110, these impeller blades being formed and arranged in such a way that they cause a fluid flow, for example an oil flow, in the interior of the housing 290 in case of a movement thereof around an axis of rotation 340 of the starting element 120. The fluid flow caused in this way is guided to a plurality of turbine blades 350, which are connected to a driven hub 370 via a corresponding retaining component 360, this driven hub 370 being the secondary side 150 of the starting element 120 in the present case. The fluid flow is guided back to the impeller blades 330 via a stator 375 which is supported so as to be rotatable in only one direction by a blocking pawl guide or ratchet guide.

Further, the mass damper torsional damper arrangement 160 is mechanically connected to the driven hub 370, i.e., the secondary side 150, substantially so as to be fixed with respect to rotation relative to it. The mass damper torsional damper arrangement 160 has a first guide component 380 and a second guide component 390 which extend substantially parallel to one another and between which at least one damper mass 400, also known as mass damper or flyweight, is movably arranged such that vibrations can be excited in the at least one damper mass 400 by a rotational movement or a component of the rotational movement around the axis of rotation 340 such that one or more vibration components can be damped or canceled through them.

Further, a two-stage torsional damper 410 having a first spring arrangement 420-1 and a second spring arrangement 420-2 is arranged with the secondary side 150, i.e., the driven hub 370 in the starting element 120 shown herein. The two spring arrangements 420 are connected in series with the driven hub 370, i.e., the secondary side 150, with respect to a torque which is transmitted into these spring arrangements 420. To this end, the torsional damper 410 has a lower hub disk 430 that contacts the spring elements of spring arrangement 420-1 and is connected to the driven hub 370 so as to be fixed with respect to rotation relative to it. Further, the spring elements of spring arrangement 420-1 contact an upper hub disk 440 which likewise contacts the spring elements of the other spring arrangement 420-2. Accordingly, a torque can be transmitted into the torsional damper 410 via the cover plate 450, with which the spring elements of spring arrangement 420-2 are also in contact, and an inner disk carrier 460 which is mechanically connected to the cover plates 450 so as to be fixed with respect to relative rotation.

The starting element 120 further comprises a lockup clutch 240. In the present case, this lockup clutch 240 is formed by a plurality of inner disks 470 and outer disks 480 that engage with the inner disk carrier 460 on one hand and with the first housing shell 310 on the other hand. In this way, the torque or rotational movement can be transmitted from the primary side 130 via the flexible connection element 280 and the first housing shell 310 to the inner disks 470 via the outer disks 480 and further via the inner disk carrier 460 to the torsional damper 410 and, therefore, to the driven hub 370 and the secondary side 150.

The inner disks 470 and the outer disks 480 form a friction clutch in which the normal force component required for providing the frictionally engaging connection or for providing the frictional contact is caused by a piston 490 guided via a dividing wall 500 riveted to the first housing shell 310 and corresponding seals so as to be sealed. The dividing wall 500 and the piston 490 accordingly divide a pressure chamber which can be acted upon by a corresponding pressure to provide the frictionally engaging connection or frictional contact.

It should be noted merely for the sake of completeness that the parts rotating relative to one another are guided and supported via corresponding bearings 510. In the implementation shown here, the torsional damper 410 and mass damper torsional damper arrangement 160 accordingly form an intermediate mass which is connected to the secondary side 150 so as to be fixed with respect to rotation relative to it.

Figure 3:
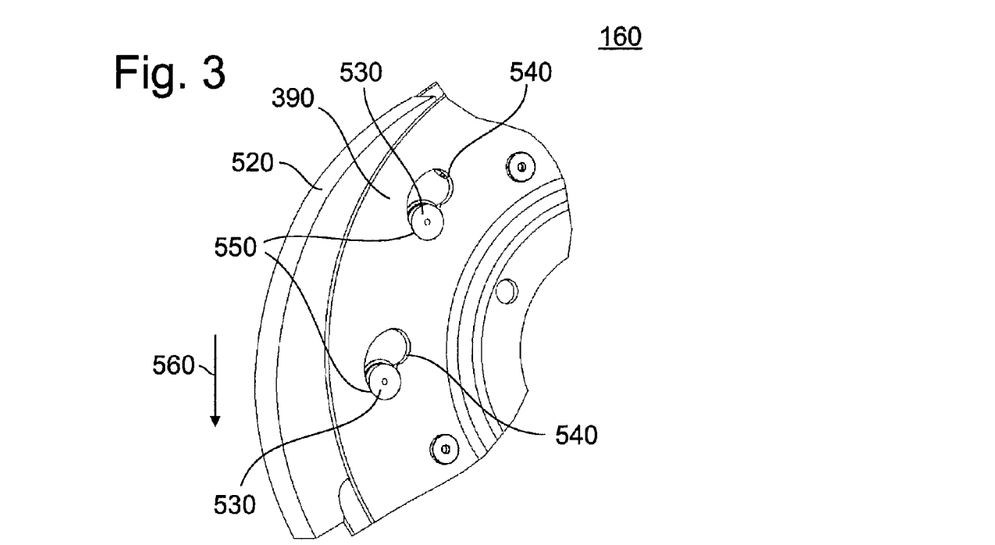
FIG. 3 is a perspective view of a mass damper torsional damper arrangement.

FIG. 3 shows a perspective view of the mass damper torsional damper arrangement 160. In the present embodiment, this mass damper torsional damper arrangement 160 has more than one damper mass 520 guided via rolling elements 530 in running paths 540 of the first and second guide components which are also referred to as retainer plates. FIG. 3 shows the second guide component 390 in the foreground.

In a vehicle with an automatic transmission 180 (automatic transmission) and a hydrodynamic starting element in the form of a torque converter with a torsional mass damper arrangement or a mass damper torsional damper arrangement 160, also referred to as a speed-adaptive mass damper or speed-adaptive mass damper system, a knocking is often heard a few seconds, e.g., 1 to 3 seconds, after the engine stops. This knocking is often perceived by the driver as annoying or even as a sign of a possible technical defect (NVH problem).

Figure 4:
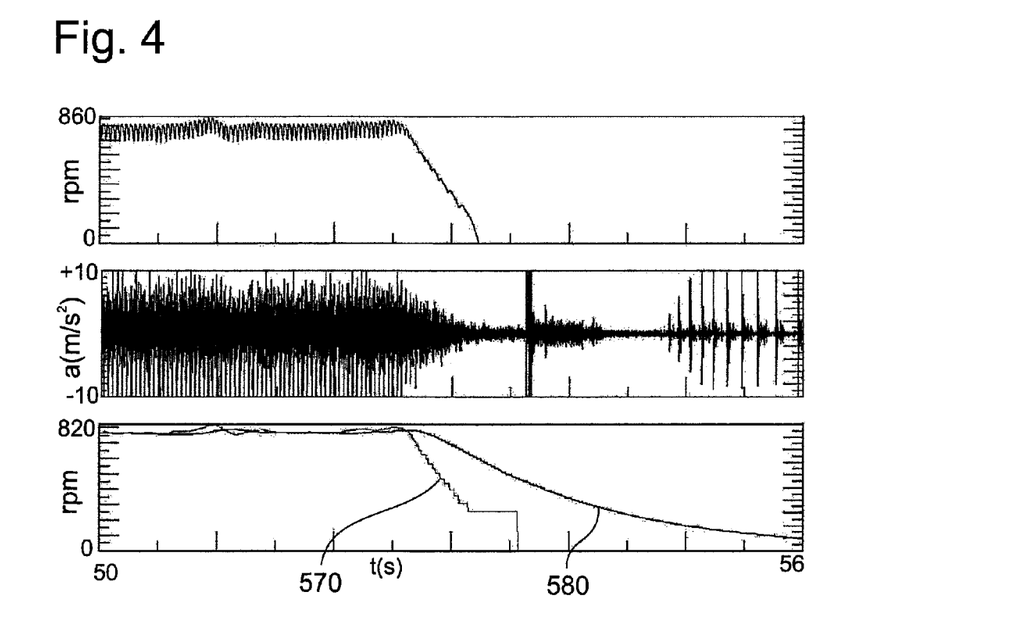
FIG. 4 is a juxtaposition of a time curve of a speed of the drive engine, vibrations occurring at a transmission bearing and information signals with respect to speeds of the drive engine and of an output shaft of the starting element.

In many mass damper torsional damper arrangements 160, the reason for this knocking is that the damper masses 520 enter end stops 550 of the guide components 380, 390 as the transmission input shaft 170 slowly rotates down. In so doing, they follow a direction of gravitational force 560 indicated by an arrow in FIG. 3, since the centrifugal force can no longer oppose the gravitational force 560 because of the slow turning off. In other words, after a certain rotational speed, the damper masses 520 follow the centrifugal force rather than the centrifugal force still acting on them. To illustrate this in more detail, FIG. 4 shows a temporal juxtaposition of different measurement values occurring within the framework of the drivetrain 100. The x-axes in the three diagrams in FIG. 4 each show a time segment between t=50 s and t=56 s.

The top diagram in FIG. 4 illustrates a curve of the rotational speed of the output shaft 140 of the drive engine 110 as measured at the flexible connection structure 280, i.e., the primary side of the starting element 120. At a time point of about 52.5 s, the rotational speed that has been substantially constant up to this point collapses and comes to a halt after about 53.2 s. The engine speed has a superimposed high-frequency period corresponding to a period of about 1500 to 1600 l/minute in the constant range as well as during the drop. This high-frequency oscillation is brought about by the firing sequence of the cylinders of the drive engine 110.

The middle diagram in FIG. 4 shows accelerations, i.e., vibrations, occurring over the same period of time measured at a transmission bearing. In the time between 50 s and 52.5 s, i.e., when the drive engine 110 runs at a substantially constant speed, the vibrations measured as acceleration a also have a substantially constant high-frequency oscillatory shape at which accelerations a occur substantially between −10 m/s$^2$ and +10 m/s$^2$. The accelerations, i.e., the vibrations at the transmission bearing, also become smaller as the drive engine 110 is turned off or stops. However, after about 53.7 s, a renewed distinct vibration occurs which persists for about 1 second, although with an appreciably reduced amplitude, before changing again to a regular knocking with high acceleration values at a time point of about 54.8 s.

The bottom diagram in FIG. 4 shows an engine speed curve 570 that illustrates the speed of the output shaft 140 of the drive unit 110. This diagram further shows a turbine speed curve 580 that corresponds to a rotational speed of the input shaft 170 of the transmission 180. Both curves can be captured via the CAN (Controller Area Network) signal bus of the corresponding control devices.

The substantial vibration at about 53.7 s coincides in time with a collapsing of the speed signal of speed curve 570 of the drive engine 110. The regular knocking structures starting at about 54.8 s are a consequence of the fact that because of the rotation of the secondary side 150, i.e., of the mass damper torsional damper arrangement 160, which still persists as can be seen from the bottom diagram in FIG. 4, a movement of the damper masses 520 still takes place, but the centrifugal forces acting on the damper masses 520 are no longer sufficient to overcome the gravitational force 560 such that the damper masses 520 no longer make contact with the end stops 550. The damper masses 520 accordingly strike the end stops 550 of the running paths 540, where they generate the comb-shaped acceleration values shown in the middle diagram of FIG. 4 which can possibly bring about an audible knocking noise.

Examples of a control device 200 and drivetrain 100 can contribute to solving this problem. These embodiments are based on the insight that it is useful in the present case to bring the transmission input shaft 170 to a standstill quickly in order to prevent the repeated impacts of the damper masses 520, also referred to as flyweights. An improvement of the NVH comfort described above can be achieved in this way.

In other words, embodiment examples are based on closing the lockup clutch 240 (converter clutch) when, for example, the operator control for gear selection, i.e., the shift stick of the transmission 180, is moved into the P position or N position when the vehicle is stationary and the ignition key is turned to stop the engine. Depending on the specific implementation, it can also possibly be sufficient, rather than closing this lockup clutch 240 completely, to impart a specific slip between the primary side 130 and the secondary side 150 in order to couple the intermediate masses, referred to above, to the primary mass, i.e., the primary side 130. In this way, since the mass damper torsional damper arrangement 160 is part of the intermediate mass and is mounted thereon and the primary mass has the engine speed, the mass damper torsional damper arrangement 160 is also braked from the residual turbine speed shown in FIG. 4 to that of the engine. In other words, the transmission input shaft 170 comes to a stop more quickly.

A transmission of torque via the starting element to the output shaft 190 of the transmission 180 is already prevented in that the transmission 180 is located in the P position or in the N position. A transmission of power from the drive engine 110 to the transmission 180 when the lockup clutch 240, as example of a coupling element 210, is closed does not come about because of the rest of the transmission clutches or actuating elements of the transmission 180. These shifting elements are generally often opened in the aforementioned positions.

Of course, as an alternative to the use of the lockup clutch 240 described above, any other coupling of the transmission 180 or any other shifting element of the transmission 180 can also be closed when the engine stops. In this way it may also be possible to bring the transmission input shaft 170 to a stop more quickly. As has already been shown in FIG. 1, this can come about, for example, in that a corresponding shifting element 270 brings the secondary side 150 with the mass damper torsional damper arrangement 160 into frictional contact with a shaft 250 or with a part of the housing of the transmission 180 such that the mass damper torsional damper arrangement 160 and the secondary side 150 connected thereto are braked. Embodiment examples can accordingly make it possible to improve the NVH comfort behavior when stopping the engine in automatic transmissions with a speed-adaptive mass damper and a corresponding torque converter.

The control device 200 can accordingly improve the compromise mentioned in the beginning by an embodiment of a method for reducing noise generation in the drivetrain 100 of the vehicle.

Figure 5:
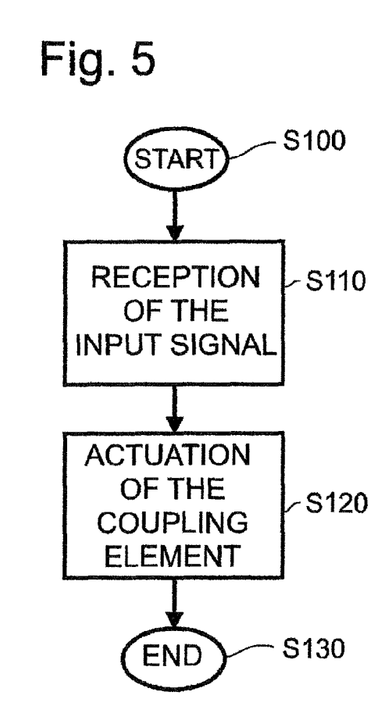
FIG. 5 is a flowchart of a method for reducing noise generation in a drivetrain of a vehicle.

FIG. 5 shows a flowchart of such an embodiment of a method for reducing noise generation in a drivetrain 100 of this type in a vehicle. After the method starts in a step S100, the above-mentioned input signal is first received in a step S110. Subsequently, in a step S120 the coupling element 210 is actuated in such a way that it brakes the secondary side 150 when the input signal indicates a turning off of the drive engine. The method then terminates in a step S130.

According to a further aspect, the control device 200 according to one embodiment a control device deviating from the control device 200 shown in FIG. 1, can be constructed to increase an inertia at an idling speed in the drivetrain 100 of the vehicle. An implementation of the coupling elements 210 is not necessary for this aspect as the case may be and can accordingly be dispensed with if required.

Accordingly, FIG. 1 also shows a drivetrain 100 according to one embodiment in which the control device is formed to cause an increase in the inertia at the idling speed in the drivetrain 100 of the vehicle.

Typically, vehicle engines often have secondary-side flywheels or clutches having a mass moment of inertia that is selected such that an acceptable compromise is reached between the requirements imposed on the drive engine. Precisely in internal combustion engines, the required idling speed is determined by the maximum possible mass moment of inertia of the flywheel or secondary-side component. Therefore, the goal is generally to select the smallest possible mass moment of inertia such that the dynamics of the engine are suitably agile and, beyond this, such that no additional acceleration forces need be applied. On the other hand, an idling speed which is as low as possible should be achieved in order to reduce fuel consumption. However, a mass moment of inertia which is as high as possible is advisable for an acceptable running of the engine at idle.

To comply with both requirements, a compromise is often made with respect to the secondary-side mass moment of inertia. Accordingly, in the case of an automatic shift transmission, the transmission 180 can be connected to the engine housing. The starting element, i.e., generally a torque converter, is connected to the drive engine 110 via a flexible connection element 280. In this case, the lockup clutch 240 is opened.

The same principle is typically also applied in wet starting clutches, where only the primary-side mass moment of inertia of the starting element 120 acts as flywheel mass.

In a control device 200 according to one embodiment, the transmission 180 is actuated in such a way that a torque transmission from the input shaft 170 to the output shaft 190 is substantially interrupted. This can take place, for example, by disengaging a gear, engaging the idle and/or opening at least one shifting element 270 of the transmission 180 such that the torque is no longer transmitted from the input shaft 170 to the output shaft 190 of the transmission.

Further, the starting element 120 is actuated in such a way that a torque transmission from the primary side 130 to the secondary side 150 is provided or increased. This can take place, for example, in that a frictionally engaging connection or a frictional contact is provided or increased. This can take place, for example, by actuating a corresponding coupling element 210, i.e., the lockup clutch 240 in case of a hydrodynamic starting element, but also by direct actuation and closing of a friction clutch.

Accordingly, the flow of power in the transmission is produced by opening the shifting elements 270 or disengaging the gear. Subsequently, the secondary-side mass can be used to increase the mass moment of inertia by closing the lockup clutch 240 or another coupling element 210 or the starting element 120 so that the engine runs more smoothly or a further reduction in the idling speed is possible since the mass moment of inertia acting as flywheel mass increases appreciably.

For example, in modern starting elements 120 comprising a mass damper torsional damper arrangement 160, the mass moment of inertia can accordingly be increased additionally in the range of multiples of 10%, for example, 40 to 80% with coupling of the secondary side. In the case of a wet friction clutch for a 9-speed automatic shift transmission, the mass moment of inertia can be increased by a factor of 1.45, for example, so that the idling speed of the drive engine 110 can possibly be reduced. Depending on the concrete layout, it may also be possible to reduce the idling speed of the drive engine 110 in a corresponding manner. Of course, the necessary transmission shifting elements must be opened to interrupt or prevent the flow of torque.

Further, the control device 200 can be constructed to actuate the starting element 120 upon a further control signal indicating a start command such that the torque transmission is canceled or reduced. Upon the corresponding further control signal, the control device can further actuate the transmission 180 such that the latter takes on an operating condition corresponding to the starting command. When the rotational speed of the drive engine 110 then reaches or exceeds a predetermined threshold speed, which predetermined threshold speed is typically above the idling speed, the control device 200 can actuate the starting element 120 such that a torque transmission from the primary side 130 to the secondary side 150 is provided or increased. The actuation of the starting element 120 for canceling or reducing the torque transmission can include canceling or weakening the fluid connection or a frictional contact in the region of the starting element 120. For example, the lockup clutch 240 can be opened, a corresponding coupling element 210 can be closed, or the entire starting element 120 can be disengaged.

In other words, upon an accelerator pedal command, the clutch is opened and in such a case the lower mass moment of inertia allows a dynamic acceleration of the drive engine 110, while the transmission shifting elements are activated. After the engine speed is reached, the engine 110 is then engaged via the starting clutch 120 and the vehicle is accelerated in accordance with the driver's command.

With regard to this aspect, a control device 200 according to one embodiment can also contribute to reinforcing the driving process by closing the clutch promptly at the time the engine is started. For example, during starting processes at low temperatures, irregular pulses in engines with a small number of cylinders may cause problems because the ignition pulses are compensated by the resistances. As a result, it can come about that the drive engine 110 does not achieve its target speed and the starting process might possibly have to be terminated. The flywheel energy can possibly be increased and the influence of the resistances reduced by means of an adapted switching on of the secondary mass moments of inertia.

Embodiment examples of a drivetrain 100 and control device 200 and the accompanying methods can also contribute to a decrease in the idling speed in a stationary vehicle by connecting the secondary-side mass inertias.

Figure 6:
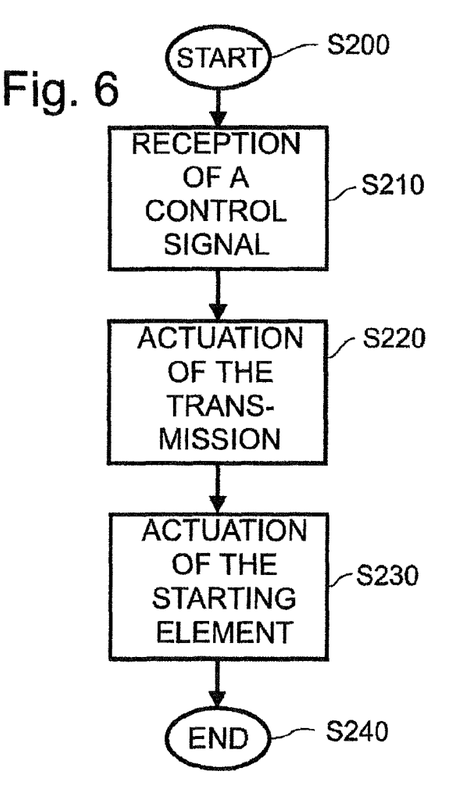
FIG. 6 is a flowchart of a method for increasing an inertia at an idling speed in a drivetrain of a vehicle.

Accordingly, FIG. 6 shows a flowchart of one embodiment a method for increasing an inertia at an idling speed in a drivetrain 100 of a vehicle such as was described above. After the start of the method in a step S200, a control signal is initially received within the framework of a step S210 which indicates that the idling speed of the drive engine 110 has been reached. Subsequently in a step S220, the transmission 180 is actuated in such a way that a torque transmission from the input shaft 170 to the output shaft 190 of the transmission 180 is substantially interrupted or prevented when the control signal indicates that the idling speed of the drive engine 110 has been reached. Subsequently in a step S230, the starting element 120 is actuated in such a way that a torque transmission from the primary side 130 to the secondary side 150 is provided or increased before the method is concluded in a step S240 although the control signal indicates here that the idling speed of the drive engine 110 has been reached.

Of course, the method steps shown in FIGS. 5 and 6 can possibly also be executed in diverging sequences and/or temporally parallel or at least temporally overlapping insofar as this is not materially impossible.

Through the use of an embodiment example, it can be possible to improve a compromise between comfort, responsiveness and ecological and economical aspects of the drivetrain.

While some aspects have been described in connection with an apparatus, it will be appreciated that these aspects also constitute a description of a corresponding method so that a module or a component of an apparatus is also to be comprehended as a corresponding method step or as a feature of a method step. Similarly, aspects which have been described in connection with, or as, a method step also constitute a description of a corresponding module or detail or feature of a corresponding apparatus.

Depending on certain implementation requirements, embodiment examples of the invention can be implemented as hardware or as software. The implementation can be carried out using a digital storage medium, for example, a floppy disk, a DVD, a Blu-ray disk, a CD, a ROM, a PROM, an EPROM, an EEPROM or a flash storage, a fixed disk or other magnetic or optical storage on which electronically readable control signals are stored which can, or do, cooperate with a programmable hardware component in such a way that the respective method is carried out.

A programmable hardware component can be formed by a processor, a computer processor (CPU or central processing unit), a graphics processor (GPU or Graphics Processing Unit), a computer, a computer system, an application-specific integrated circuit (ASIC), an integrated circuit (IC), a system on a chip (SOC), a programmable logic element or field programmable gate array (FPGA) with a microprocessor.

Therefore, the digital storage medium can be machine-readable or computer-readable. Some embodiment examples accordingly include a data carrier having electronically readable control signals which are capable of cooperating with a programmable computer system or with a programmable hardware component so as to carry out one of the methods described herein. Accordingly, an embodiment example is a data carrier (or a digital storage medium or a computer-readable medium) on which the program for implementing one of the methods described herein is recorded.

In general, embodiment examples of the present invention can be implemented as program, firmware, computer program or computer program product with a program code or as data, wherein the program code or the data operate(s) so as to implement one of the methods when the program runs on a processor or on a programmable hardware component. The program code or the data can also be stored, for example, on a machine-readable medium or data carrier. The program code or the data can be provided inter alia as source code, machine code or byte code or as another intermediate code.

Further, another embodiment example is a data stream, a signal flow or a sequence of signals constituting the program for implementing one of the methods described herein. The data stream, signal flow or sequence of signals can be configured, for example, so as to be transferred via a data communications link, for example, via the Internet or other network. Accordingly, embodiment examples are also signal sequences which represent data and which are suitable for sending over a network or data communications link, wherein the data constitute the program.

A program according to one embodiment can implement one of the methods when executed in that this program reads storage locations or writes a datum or a plurality of data into the latter so that, as the case may be, switching processes or other processes are brought about in transistor structures, amplifier structures or in other components operating electrically, optically, magnetically or in some other way. In a corresponding manner, data, values, sensor values or other information can be detected, determined or measured by a program by reading a storage location. Therefore, a program can detect, determine or measure quantities, values, measured quantities and other information by reading one or more storage locations and can cause, initiate or execute an action and control other devices, machines and components by writing to one or more storage locations and can accordingly also execute more complex method steps by actuators, for example.

The embodiment examples described above only illustrate the principles of the present invention. It will be appreciated that modifications and variations of the arrangements and details described herein will be clear to other skilled persons. Therefore, it is intended that the invention be limited only by the protective scope of the appended patent claims and not by the specific details which were presented herein with reference to the description and explanation of the embodiment examples.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control device for a drivetrain of a vehicle, the drivetrain comprising:
    a drive engine;
    a coupling element; and
    a starting element that comprises:
        a primary side coupled to the drive engine;
        a torsional mass damper arrangement with at least one damper mass,
        a secondary side coupled to the torsional mass damper arrangement so as to be fixed with respect to relative rotation,
        wherein the coupling element is configured to brake the secondary side by at least one of:
            coupling with the primary side of the starting element and
            coupling with a reference component that is stationary when the vehicle is stationary,
    wherein the control device actuates the coupling element such that the coupling element brakes the secondary side when the control device receives an input signal indicating a switching off of the drive engine; and
    an automatic transmission coupled via a transmission input shaft to the secondary side and comprises the reference component,
    wherein the coupling element comprises a shifting element that forms a frictionally engaging connection to the reference component, and
    wherein the reference component, is one of a shaft of the automatic transmission and a part of a housing of the automatic transmission.

2. The control device according to claim 1, wherein the coupling element comprises a hydrodynamic starting element configured to transmit a rotational movement from the primary side to the secondary side, the coupling element comprises a lockup clutch of the hydrodynamic starting element that couples the primary side and the secondary side to one another via one of a frictionally engaging connection or a frictional contact.

3. The control device according to claim 1, wherein the input signal indicates a switching off of the drive engine initiated by one or more of
    a driver of the vehicle and
    a decrease in a rotational speed of an output shaft of the drive engine or an input shaft of the starting element below a predetermined threshold speed,
    wherein the predetermined threshold speed corresponds to at most 90% of an idling speed of the drive engine.

4. The control device according to claim 1 configured to brake the secondary side upon the input signal only when a further condition is met,
    wherein the further condition is a further input signal that indicates a non-driving setting of the automatic transmission.

5. The control device according to claim 1, wherein the shifting element is one of a disk clutch and a band brake.

6. A drivetrain for a vehicle, comprising:
    a drive engine;
    a starting element that comprises a torsional mass damper arrangement with at least one damper mass, wherein the starting element is coupled to the drive engine by a primary side and has a secondary side fixed with respect to relative rotation to the torsional mass damper arrangement;

a coupling element configured to brake the secondary side by at least one of:

coupling with the primary side of the starting element and coupling with a reference component that is stationary when the vehicle is stationary; and a control device configured to actuate the coupling element such that the coupling element brakes the secondary side when the control device receives an input signal indicating a switching off of the drive engine; and an automatic transmission coupled via a transmission input shaft to the secondary side and comprises the reference component, wherein the coupling element comprises a shifting element that forms a frictionally engaging connection to the reference component, and wherein the reference component, is one of a shaft of the automatic transmission and a part of a housing of the automatic transmission.

7. A control device for a drivetrain of a vehicle, comprising:

a drive engine;
a transmission; and
a starting element that comprises a torsional mass damper arrangement, the starting element is coupled with the drive engine by a primary side and coupled to an input shaft of the transmission by a secondary side to be fixed with respect to relative rotation of the torsional mass damper arrangement, wherein the control device is configured that, upon receiving a control signal indicating an idling speed of the drive engine has been reached, the control device actuates the transmission such that a torque transmission from the input shaft of the transmission to an output shaft of the transmission is substantially prevented and actuates the starting element such that a torque transmission from the primary side to the secondary side is one of provided and increased, wherein the control device is configured such a further control signal indicating a start-up command one of actuates the starting element such that the torque transmission is one of canceled or reduced, actuates the transmission such that it takes on an operating condition corresponding to the start-up command, and actuates the starting element in such a way that a torque transmission from the primary side to the secondary side is one of provided and increased when a speed of the drive engine exceeds a predetermined threshold speed.

8. The control device according to claim 7, wherein the actuation of the transmission for preventing torque transmission comprises at least one of:

disengagement of a gear,
engagement of an idling gear, and
opening of at least one shifting element of the transmission whereby the torque is no longer transmitted from the input shaft to the output shaft of the transmission.

9. The control device according to claim 7, wherein the actuation of the starting element for the one of the providing and the increasing the torque transmission comprises providing one of a frictionally engaging connection and a frictional contact.

10. The control device according to claim 7,
wherein the starting element comprises a hydrodynamic torque converter with a lockup clutch,
wherein the actuation of the starting element for the one of the providing or the increasing the torque transmission is performed such that the lockup clutch is closed.

11. A method for increasing an inertia at an idling speed in a drivetrain of a vehicle, wherein the drivetrain comprises a drive engine and a starting element, wherein the starting element comprises a torsional mass damper arrangement, wherein the starting element is coupled with the drive engine by a primary side and with an input shaft of the transmission so as to be fixed with respect to relative rotation to the torsional mass damper arrangement by a secondary side, comprising:

receiving a control signal indicating that the idling speed of the drive engine has been reached;

actuating the transmission such that a torque transmission from the input shaft to an output shaft of the transmission is substantially prevented when the control signal indicates that the idling speed of the drive engine has been reached; and actuating the starting element such that a torque transmission from the primary side to the secondary side is one of provided or increased when the control signal indicates that the idling speed of the drive engine has been reached.

* * * * *